No. 644,213. Patented Feb. 27, 1900.
E. G. NICEWANER.
MOTOR SUSPENSION.
(Application filed Aug. 22, 1893.)

(No Model.)

WITNESSES:

INVENTOR
E. G. Nicewaner
BY
Geo. H. Parmelee
his ATTORNEY.

UNITED STATES PATENT OFFICE.

EDWIN G. NICEWANER, OF JOHNSTOWN, PENNSYLVANIA, ASSIGNOR TO THE LORAIN STEEL COMPANY, OF PENNSYLVANIA.

MOTOR SUSPENSION.

SPECIFICATION forming part of Letters Patent No. 644,213, dated February 27, 1900.

Application filed August 22, 1899. Serial No. 728,070. (No model.)

*To all whom it may concern:*

Be it known that I, EDWIN G. NICEWANER, of Johnstown, in the county of Cambria and State of Pennsylvania, have invented a new and useful Improvement in Motor Suspensions, of which the following is a full, clear, and exact description, reference being had to the accompanying drawings, which form a part of this specification.

This invention relates to motor suspensions, and is designed to provide means of novel character for elastically connecting and supporting a pair of electric motors sleeved at one end to opposite axles of a car-truck, the connection and support being independent of both the car-body and the truck-frame.

With this object in view the invention consists in the combination, with a pair of electric motors, of an elastic member extending from one motor to the other and supported at its ends upon the motor frames or casings, with connections between the said member and the nose or free end of both motors.

The invention also consists in the novel construction and combination of parts, all as hereinafter described and shown.

The invention is particularly applicable to double trucks or other trucks having a comparatively-short wheel-base.

Figure 1:
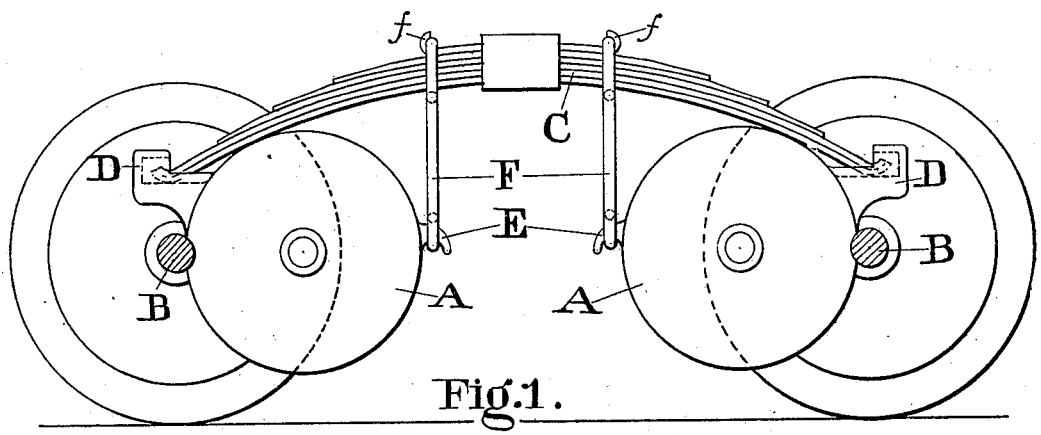
Figure 2:
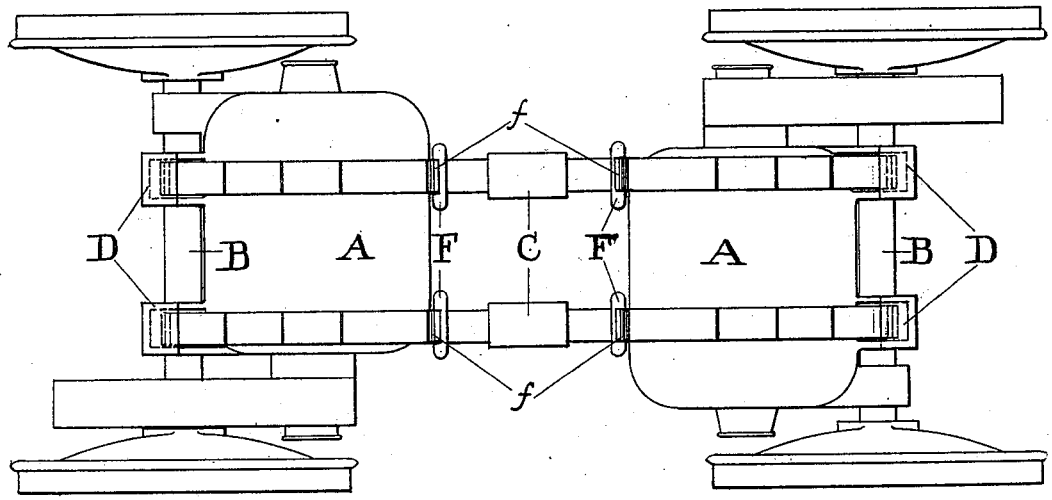
Figure 3:
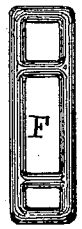

Referring to the accompanying drawings, Figure 1 is a side view, partly in section, of a car-truck and motors having my improved suspension; and Fig. 2 is a plan view of the same. Fig. 3 is a detail view. In these figures I have omitted the truck-frame, which may be of any approved construction and which forms no part of my present invention.

The letters A A designate the two motors, each of which is sleeved in the usual manner to an axle B of the truck. C designates an elastic member which connects the two motors and which consists, preferably, of a semi-elliptic spring, as shown. The motors are each provided with a seat for the respective ends of this spring. In the construction shown these seats are formed by projections D, overhanging the axles and having sockets to receive the end portions of the springs.

Each motor frame or casing is provided at its nose end with a suitable lug or hook E to receive a tie connection or loop F, whose upper end is engaged with the spring C. To secure these tie-loops, the upper short leaf of the spring may be formed with hooked ends f. These loops have cross-bars, as shown in Fig. 3, for bearing engagement with the nose-lugs and with the spring.

I preferably employ two of the springs C, arranged substantially as shown in Fig. 2.

By the means described I provide a suspension for the motors which effectively cushions them against movements due to torque and track unevenness, while it permits such movements to a limited extent. I also provide a suspension which is independent of the car-body and also of the truck-frame and which is therefore not affected by the movements of either.

I do not wish to limit myself to the particular construction which I have herein shown and described, as the same may be varied without departing from the spirit and scope of my invention.

Having thus described my invention, what I claim, and desire to protect by Letters Patent, is—

1. The combination with two electric motors each sleeved to an opposite axle of a truck, of an elastic connecting member rested at its ends upon the motor frames or casings, and connections between said member and the nose ends of both the motors.

2. The combination with two electric motors each sleeved to an opposite axle of a truck, of a spring rested at its ends upon the motor frames or casings, and ties connecting the spring with the nose ends of the motors.

3. The combination with two electric motors, each sleeved to an opposite axle of a truck, of a semi-elliptic spring rested at its ends upon the tops of the motor frames or casings and loops engaging the said springs and lugs or projections at the nose ends of the said frames or casings.

4. The combination with two electric motors each sleeved to an opposite axle of a truck, having lugs at their nose ends, and also projections overhanging the truck-axles, of a spring resting at its ends upon the tops of the motors and engaging the said projections, and ties connecting the nose-lugs with the said spring.

5. The combination with two electric motors each sleeved to an opposite axle of a truck, of a pair of springs resting at their ends upon the said motors and engaging lugs or projections thereof, and ties connecting the nose end of each motor with both of the said springs.

6. The combination with two electric motors each sleeved to an opposite axle of a cartruck, of a spring whose ends bear upon the tops of the motor frames or casings at one side of the centers of gravity of the motors, and connections between the said springs and the motors at the opposite sides of their centers of gravity.

7. The combination with two electric motors each sleeved to an opposite axle of a cartruck, of a spring whose end portions are supported by the motors, and connections between the said spring and the nose end of both motors.

8. The combination with two electric motors each sleeved to an opposite axle of a cartruck, and having their frames provided with lugs at their nose ends, and also with socketed projections overhanging the truck-axles, of a spring whose end portions engage the sockets of said projections, and tie-loops engaging the said springs and also the nose-lugs of the motors.

In testimony whereof I have affixed my signature in presence of two witnesses.

E. G. NICEWANER.

Witnesses:
B. M. SMITH,
H. W. SMITH.